United States Patent
Harode et al.

(10) Patent No.: US 11,634,351 B2
(45) Date of Patent: Apr. 25, 2023

(54) METHOD FOR SINTERING OF OPTICAL FIBRE PREFORM

(71) Applicant: Sterlite Technologies Limited, Aurangabad (IN)

(72) Inventors: Hima Harode, Aurangabad (IN); Rahul Prasad, Aurangabad (IN); Shubhanshu Agarwal, Aurangabad (IN)

(73) Assignee: Sterlite Technologies Limited, Haryana (IN)

( * ) Notice: Subject to any disclaimer, the term of this patent is extended or adjusted under 35 U.S.C. 154(b) by 48 days.

(21) Appl. No.: 16/993,209

(22) Filed: Aug. 13, 2020

(65) Prior Publication Data

US 2021/0070647 A1   Mar. 11, 2021

(30) Foreign Application Priority Data

Aug. 13, 2019 (IN) .............................. 201921032706

(51) Int. Cl.
*C03B 37/012* (2006.01)

(52) U.S. Cl.
CPC .. *C03B 37/01282* (2013.01); *C03B 37/01222* (2013.01); *C03B 37/01245* (2013.01)

(58) Field of Classification Search
None
See application file for complete search history.

(56) References Cited

U.S. PATENT DOCUMENTS

| | | | |
|---|---|---|---|
| 7,489,850 B1* | 2/2009 | Berkey | C03B 37/01446 385/141 |
| 2004/0099015 A1* | 5/2004 | Leppert | C03C 25/607 65/424 |
| 2015/0143852 A1* | 5/2015 | Bookbinder | C03B 37/01453 65/397 |
| 2016/0009589 A1* | 1/2016 | Billings | G02B 6/0365 65/412 |
| 2016/0214884 A1* | 7/2016 | Inoue | C03B 37/01245 |
| 2017/0101335 A1* | 4/2017 | Chludzinski | C03B 37/01222 |
| 2017/0101339 A1* | 4/2017 | Luo | C03C 25/1061 |

(Continued)

FOREIGN PATENT DOCUMENTS

CN    104261689 A *  1/2015
WO   WO-0147822 A1 *  7/2001 ....... C03B 37/01446

*Primary Examiner* — Lisa L Herring
(74) *Attorney, Agent, or Firm* — Steven R. Fairchild; Michael J. Pennington

(57) ABSTRACT

The present disclosure provides a method for sintering of an optical fibre preform. The method includes manufacturing of the optical fibre preform. In addition, the method includes drying and sintering of the optical fibre preform. In addition, drying and sintering of the optical fibre preform results into a sintered optical fibre preform. Further, the method includes preparation of a glass rod from the sintered optical fibre preform. Furthermore, the method includes insertion of the glass rod into a centreline hole of the silica soot preform. The centreline hole is created by removing mandrel from the silica soot preform. Moreover, the method includes drying and sintering of the silica soot preform. Also, drying and sintering of the silica soot results into a sintered silica soot preform. Also, the method includes drawing of a rod from the sintered silica soot preform.

8 Claims, 1 Drawing Sheet

(56) References Cited

U.S. PATENT DOCUMENTS

2017/0363806 A1* 12/2017 Bookbinder ........... G02B 6/036
2018/0002217 A1* 1/2018 Boughton ......... C03B 37/01222
2018/0224598 A1* 8/2018 Endoh .................... G02B 6/036

\* cited by examiner

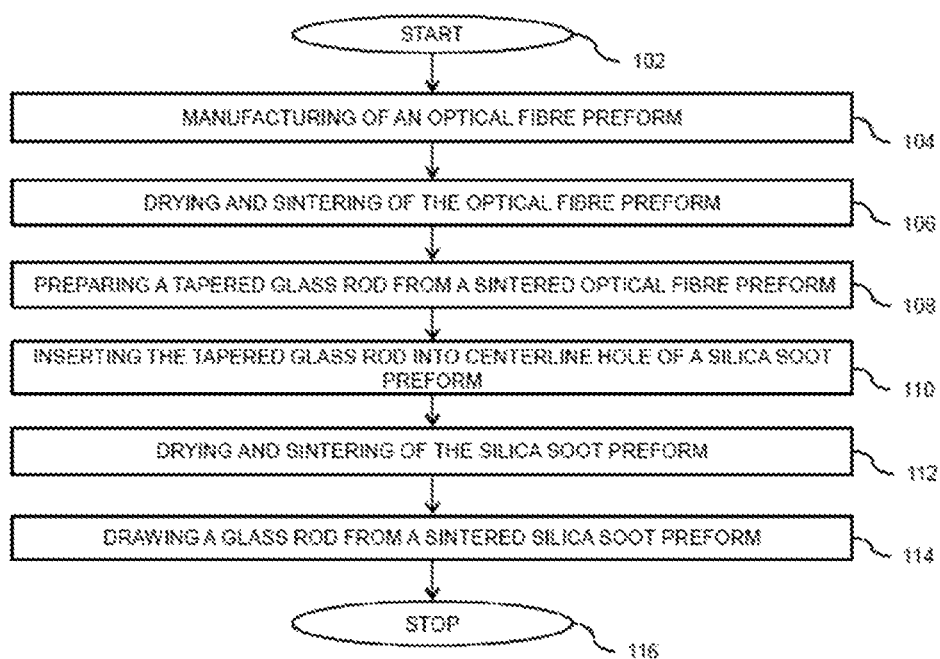

METHOD FOR SINTERING OF OPTICAL FIBRE PREFORM

BACKGROUND OF THE INVENTION

Field of the Invention

The present disclosure relates to the field of optical fibre and, in particular, relates to sintering of an optical fibre preform. This application is based on, and claims priority from an Indian Application Number 201921032706 filed on 13 Aug. 2019.

Description of the Related Art

The manufacturing process of optical fibre preform includes various methods. The various methods includes outside vapor deposition method, chemical vapor deposition method and the like. In outside vapor deposition method, a mandrel is used to manufacture a preform. The soot is deposited over the mandrel. Further, the mandrel is removed from the preform that creates a centerline hole or a capillary. Further, the generated preform is passed through a furnace. Furthermore, drying and sintering process is performed over the preform in the furnace. Moreover, the centerline hole or the capillary at the top of the preform remains uncollapsed due to insufficient gravity. Also, this uncollapsed centerline hole or the capillary results to undesired bubbles which further leads to weakness in optical fibre. The insufficient gravity drives viscous flow of silica towards the center of the preform. This process results in wastage of glass that can otherwise be used to draw rods. This leads to more machine time that will further increase the cost.

In light of the foregoing discussion, there is a need for improved method of sintering of an optical fibre preform that overcomes the above cited drawbacks.

BRIEF SUMMARY OF THE INVENTION

In an aspect, the present disclosure provides a method for fabrication of an optical fibre soot preform. The method includes production of silicon dioxide particles along with waste particulates. In addition, the method includes cooling of the silicon dioxide particles. Further, the method includes agglomeration of the silicon dioxide particles. Furthermore, the method includes separation of the waste particulates from the silicon dioxide particles. Also, the waste particulates include hydrogen chloride (herein after HCl), water ($H_2O$), air, and nitrogen ($N_2$). Also the method includes dehydration of the silicon dioxide particles. Moreover, the method includes compaction of the silicon dioxide particles. The silicon dioxide particles are produced using a precursor material in a combustion chamber. Also, the cooling of the silicon dioxide particles is done with facilitation of a jacket cooling chamber. Further, the agglomeration of the silicon dioxide particles is performed using a plurality of agglomerator tubes. Furthermore, the separation of the waste particulates from the silicon dioxide particles is carried out in a cyclone separator. Also, the silicon dioxide particles are dehydrated to remove water molecules from the silicon dioxide particles. Also, the compaction of the silicon dioxide particles facilitates fabrication of the optical fibre soot preform in a preform compaction chamber.

In an embodiment of the present disclosure, the optical fibre preform has D/d ratio in range of 1 to 1.1. The optical fibre preform has refractive index in range of about 2 to 5.

In an embodiment of the present disclosure, drying of optical fibre preform is performed at temperature in range of about 1000° Celsius to 1100° Celsius in presence of helium and chlorine atmosphere. In addition, sintering is performed at temperature in range of about 1500° Celsius to 1590° Celsius in presence of helium and chlorine atmosphere.

In an embodiment of the present disclosure, the method includes soaking of the sintered optical fibre preform in presence of nitrogen atmosphere. The soaking of the sintered optical fibre preform is performed at temperature of about 1000° Celsius. The soaking of the sintered optical fibre preform is done continously for about 18 hours.

In an embodiment of the present disclosure, the glass rod is drawn from the sintered optical fibre preform. The glass rod has diameter in range of about 5.5±0.5 millimeter to 7.5±0.5 millimeter.

In an embodiment of the present disclosure, the glass rod undergoes HF etching for about 1 hour. The glass rod undergoes D2 soaking for about 10-18 hours for removing OH ion concentration from the glass rod.

In an embodiment of the present disclosure, the silica soot preform is doped with germanium. The silica soot preform has D/d ratio in range of 2.4 to 4.2.

In an embodiment of the present disclosure, drying of the silica soot preform is performed at temperature in range of about 1000° Celsius to 1100° Celsius in helium and chlorine atmosphere. In addition, sintering of the silica soot preform is performed at temperature in range of about 1500° Celsius to 1590° Celsius in helium and chlorine atmosphere.

In an embodiment of the present of disclosure, soaking of the sintered silica soot preform is performed. In addition, soaking of the sintered silica soot preform is performed in presence of nitrogen atmosphere. Further, soaking of the sintered silica soot preform is done at temperature of 1000° Celsius. Furthermore, soaking of the sintered soot preform is done continuously for 18 hours.

In an embodiment of the present disclosure, the rod is drawn from the sintered silica soot preform.

DESCRIPTION OF THE DRAWINGS

In order to best describe the manner in which the above-described embodiments are implemented, as well as define other advantages and features of the disclosure, a more particular description is provided below and is illustrated in the appended drawings. Understanding that these drawings depict only exemplary embodiments of the invention and are not therefore to be considered to be limiting in scope, the examples will be described and explained with additional specificity and detail through the use of the accompanying drawings in which:

FIG. 1 illustrates a flow chart of a method for sintering of an optical fibre preform, in accordance with various embodiment of the present disclosure.

It should be noted that the accompanying FIGURES are intended to present illustrations of exemplary embodiments of the present disclosure. These FIGURES are not intended to limit the scope of the present disclosure. It should also be noted that accompanying FIGURES are not necessarily drawn to scale.

DETAILED DESCRIPTION OF THE INVENTION

Reference will now be made in detail to selected embodiments of the present disclosure in conjunction with accompanying FIGURES. The embodiments described herein are not intended to limit the scope of the disclosure, and the present disclosure should not be construed as limited to the embodiments described. This disclosure may be embodied in different forms without departing from the scope and spirit of the disclosure. It should be understood that the accompanying FIGURES are intended and provided to illustrate embodiments of the disclosure described below and are not necessarily drawn to scale. In the drawings, like numbers refer to like elements throughout, and thicknesses and dimensions of some components may be exaggerated for providing better clarity and ease of understanding.

It should be noted that the terms "first", "second", and the like, herein do not denote any order, ranking, quantity, or importance, but rather are used to distinguish one element from another. Further, the terms "a" and "an" herein do not denote a limitation of quantity, but rather denote the presence of at least one of the referenced item.

FIG. 1 illustrates a flow chart 100 of a method for sintering of an optical fibre preform, in accordance with various embodiment of the present disclosure. In general, optical fibre preform is glass body used to draw optical fibre.

The flow chart 100 initiates at step 102. Following step 102, at step 104, the method performs manufacturing of the optical fibre preform. In general, optical fibre preform is a large cylindrical body of glass having a core structure and a cladding structure. In addition, optical fibre preform is a material used for fabrication of optical fibres. In an embodiment of the present disclosure, the optical fibre preform is a porous germania doped silica soot preform. In an embodiment of the present disclosure, the optical fibre preform is prepared by depositing soot over a mandrel. In general, soot is powdery or flaky substance consisting largely of amorphous silica produced by incomplete burning of organic matter. In an embodiment of the present disclosure, the mandrel is mounted on a lathe. In general, lathe is machine tool that rotates workpiece about axis of rotation to perform various operations. In addition, the various operators performed by lathe are cutting, drilling, knurling, deformation and the like. In general, mandrel is a driving spindle in headstock of lathe. In addition, mandrel is placed over a heat source and reacted with one or more gases. In an embodiment of the present disclosure, the optical fibre preform has D/d ratio in range of about 1 to 1.1. The D/d ratio is core to clad ratio. In an embodiment of the present disclosure, the optical fibre preform has refractive index in range of about 2 to 5. In another embodiment of the present disclosure, range of refractive index of the optical fibre preform may vary.

At step 106, the method performs drying of the optical fibre preform. In general, drying is a process of removing water and other impurities from the optical fibre preform. In addition, drying refers to removal of OH ion content from the optical fibre preform. In an embodiment of the present disclosure, drying of the optical fibre preform is performed at temperature in range of about 1000° Celsius to 1100° Celsius. In another embodiment of the present disclosure, drying of the optical fibre preform is performed at temperature of any suitable range. In an embodiment of the present disclosure, drying is performed in a consolidated furnace in presence of helium and chlorine atmosphere.

Further, the method performs sintering of the optical fibre preform. In general, sintering refers to a process of forming a glass preform from the compacted silica soot with facilitation of heat without melting compacted silica soot to point of liquefication. In addition, liquefication refers to the point where the material obtains a compact shape without reaching its melting point. In an embodiment of the present disclosure, sintering of the optical fibre preform is performed in the consolidated furnace at temperature in range of about 1500° Celsius to 1590° Celsius. In another embodiment of the present disclosure, sintering of optical fibre preform is performed at temperature of any suitable range.

In an embodiment of the present disclosure, sintering of the optical fibre preform is performed in presence of helium and chlorine atmosphere. In an embodiment of the present disclosure, sintering of the optical fibre preform produces a sintered optical fibre preform.

Further, the sintered optical fibre preform undergoes soaking. In addition, soaking of the sintered optical fibre preform is performed in presence of nitrogen atmosphere. In an embodiment of the present disclosure, soaking is performed at temperature of 1000° Celsius. In another embodiment of the present disclosure, soaking is performed at any suitable temperature. In an embodiment of the present disclosure, soaking of the sintered optical fibre preform is done continuously for about 18 hours.

At step 108, the sintered optical fibre preform is utilized to prepare a glass rod. In an embodiment of the present disclosure, the glass rod is a tapered glass rod. In another embodiment of the present disclosure, the glass rod is an untapered glass rod. In an embodiment of the present disclosure, the glass rod is drawn out of the sintered optical fibre preform using a drawing furnace. In another embodiment of the present disclosure, the glass rod is drawn out of the sintered optical fibre preform using a glass working lathe.

In an embodiment of the present disclosure, diameter of the glass rod is in range of about 5.5±0.5 millimeter to 7.5±0.5 millimeter. In another embodiment of the present disclosure, range of diameter of the glass rod may vary. Further, the glass rod undergoes HF etching. In general, HF etching is a form of wet etching that uses hydrofluoric acid to etch out surfaces. In addition, HF refers to hydrofluoric acid. In an embodiment of the present disclosure, the HF etching is performed over the glass rod for about 1 hour. In addition, the glass rod undergoes D2 soaking for about 10-18 hours for removing OH ion concentration from the glass rod.

Further, at step 110, a silica soot preform is prepared. In an embodiment of the present disclosure, the silica soot preform has D/d ratio in range of 2.4 to 4.2. In addition, silica soot preform is doped with germania. In an embodiment of the present disclosure, the silica soot preform has weight in range of 12 kilogram to 16 kilogram. In another embodiment of the present disclosure, range of weight of the silica soot preform may vary. In addition, the silica soot preform has diameter in range of about 160 millimeter to 180 millimeter. In an embodiment of the present disclosure, range of diameter of the silica soot preform may vary. Further, the silica soot preform has length of about 1200 millimeter. In an embodiment of the present disclosure, length of the silica soot preform may vary.

In an example, the silica soot preform is prepared by depositing soot over a mandrel. Furthermore, the mandrel is removed from the silica soot preform. In addition, removal of the mandrel from the silica soot preform results in creation of a centerline hole. In an embodiment of the present disclosure, the glass rod is inserted inside the centerline hole of the silica soot preform.

At step 112, the method performs drying of the silica soot preform. In an embodiment of the present disclosure, drying of the silica soot preform is performed at temperature in range of about 1000° Celsius to 1100° Celsius. In another embodiment of the present disclosure, drying of the silica soot preform is performed at any suitable temperature. In an embodiment of the present disclosure, drying is performed in presence of helium and chlorine atmosphere. In addition, drying of the silica soot preform leads to removal of OH ion concentration from the silica soot preform. Further, the silica soot preform undergoes sintering. In an embodiment of the present disclosure, the sintering of the silica soot preform is performed with a suction pressure in range of about 80 milibar to 120 milibar. In another embodiment of the present disclosure, sintering of the silica soot preform is performed with the suction pressure of any suitable range. In general, suction pressure is a negative difference in pressure generated between two points which draws a gas or a liquid from a higher to a lower pressure state. In another embodiment of the present disclosure, sintering of the silica soot preform is performed in presence of helium and chlorine atmosphere. In an embodiment of the present disclosure, sintering of the silica soot preform leads to formation of a sintered silica soot preform.

Further, the sintered silica soot preform undergoes soaking. In addition, soaking of the sintered silica soot preform is performed in presence of nitrogen atmosphere. In an embodiment of the present disclosure, soaking is performed at temperature of 1000° Celsius. In another embodiment of the present disclosure, soaking of the sintered silica soot preform is performed at any suitable temperature. In an embodiment of the present disclosure, soaking of the sintered silica soot preform is done continuously for about 18 hours.

At step 114, the sintered silica soot preform is utilized to draw one or more rods. In an example, the sintered silica soot preform is utilized to draw a maximum of 8 rods. In addition, the sintered silica soot preform has weight in range of 12 kilogram to 20 kilogram. In an embodiment of the present disclosure, weight of the sintered silica soot preform may vary. Further, each glass rod of the 8 rods has length of about 1100 millimeter. In an embodiment of the present disclosure, length of each glass rod of the 8 rods may vary. Furthermore, each rod of the 8 rods has diameter of about 25 millimeter. In an embodiment of the present disclosure, diameter of each rod of the 8 rods may vary. The flow chart terminates at step 116.

The present disclosure provides numerous advantages over the prior art. The present disclosure provides an improved method for sintering of the optical fibre preform with reduced glass wastage. In addition, the method for sintering of the optical fibre preform is cost effective and requires less overall process time. Further, the method provides ease of operation during sintering of the optical fibre preform.

The foregoing descriptions of pre-defined embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

What is claimed is:

1. A method for sintering of an optical fibre preform, the method comprising:
   manufacturing of the optical fibre preform, wherein the optical fibre preform is a porous germania doped silica soot preform;
   drying and sintering of the optical fibre preform, wherein drying and sintering of the optical fibre preform results into a sintered optical fibre preform;
   preparing a glass rod from the sintered optical fibre preform, wherein the glass rod has length in a range of 800 to 1100 millimeter;
   inserting the glass rod into a centerline hole of a silica soot preform, wherein the centerline hole is created by removing mandrel from the silica soot preform;
   drying and sintering of the silica soot preform, wherein drying and sintering of the silica soot preform results into a sintered silica soot preform; and
   drawing multiple rods such that each rod of the multiple rods has a length less than 1100 mm and a diameter less than 25 mm from the sintered silica soot preform, wherein the optical fibre preform has refractive index in a range of 2 to 5.

2. The method as claimed in claim 1, wherein drying of the optical fibre preform is performed at temperature in a range of 1000° Celsius to 1100° Celsius in presence of helium and chlorine atmosphere, wherein sintering of the optical fibre preform is performed at temperature in a range of 1500° Celsius to 1590° Celsius in presence of helium and chlorine atmosphere.

3. The method as claimed in claim 1, further comprising soaking of the sintered optical fibre preform, wherein soaking of the sintered optical fibre preform is performed in presence of nitrogen atmosphere, wherein soaking of the sintered optical fibre preform is done at temperature of 1000° Celsius, wherein soaking of the sintered optical fibre preform is done continuously for 18 hours.

4. The method as claimed in claim 1, wherein the glass rod is drawn from the sintered optical fibre preform, wherein the glass rod has diameter in a range of 5.5±0.5 millimeter to 7.5±0.5 millimeter.

5. The method as claimed in claim 1, wherein the glass rod undergoes HF etching for 1 hour, wherein the glass rod undergoes D2 soaking for 10-18 hours for removing OH ion concentration from the glass rod.

6. The method as claimed in claim 1, wherein the silica soot preform is doped with germania.

7. The method as claimed in claim 1, wherein drying of the silica soot preform is performed at temperature in a range of 1000° Celsius to 1100° Celsius in helium and chlorine atmosphere, wherein sintering of the silica soot preform is performed at temperature in a range of 1500° Celsius to 1590° Celsius in helium and chlorine atmosphere.

8. The method as claimed in claim 1, further comprising soaking of the sintered silica soot preform, wherein soaking of the sintered silica soot preform is performed in presence of nitrogen atmosphere, wherein soaking of the sintered silica soot preform at temperature of 1000° Celsius, wherein soaking of the sintered silica soot preform is done continuously for 18 hours.

* * * * *